United States Patent [19]
Inoue

[11] Patent Number: 5,575,732
[45] Date of Patent: Nov. 19, 1996

[54] TOROIDAL CONTINOUS VARIABLE TRANSMISSION

[75] Inventor: Eiji Inoue, Sagamihara, Japan

[73] Assignee: Isuzu Motors Limited, Tokyo, Japan

[21] Appl. No.: 400,582

[22] Filed: Mar. 8, 1995

[51] Int. Cl.$^6$ .................................................. F16H 13/38
[52] U.S. Cl. ............................................. 476/10; 477/50
[58] Field of Search ................................ 476/10, 40, 42; 477/50

[56] References Cited

U.S. PATENT DOCUMENTS

| | | | |
|---|---|---|---|
| 4,669,334 | 6/1987 | Miyaura et al. | 477/50 |
| 5,042,326 | 8/1991 | Hibi et al. | 477/50 |

FOREIGN PATENT DOCUMENTS

| | | |
|---|---|---|
| 61-82065 | 4/1986 | Japan . |
| 62-46060 | 2/1987 | Japan . |
| 63-203957 | 8/1988 | Japan . |

*Primary Examiner*—Allan D. Herrmann
*Attorney, Agent, or Firm*—Browdy and Neimark

[57] ABSTRACT

Power rollers in a toroidal continuous variable transmission receive an external force from input and output discs. The external force is supplied to trunnions, so that pressure in one cylinder chamber becomes higher than that in the other, and a sleeve is urged to be shifted away from a neutral position. However, return force urging the sleeve back to the neutral position occurs. Since this return urging force is equal in magnitude to the external force and works in the direction opposite to that of the external force, the external force is offset by the urging force, and the trunnions are not displaced. Or, a controller outputs a control signal, corresponding to a difference between a target variable speed ratio and an actual variable speed ratio, to solenoid valves so as to generate in the cylinder chambers a pressure difference for offsetting the external force F. Accordingly the trunnions are maintained in the neutral positions, and a speed changing operation is not started again.

8 Claims, 6 Drawing Sheets

TOROIDAL CONTINUOUS VARIABLE TRANSMISSION

BACKGROUND OF THE INVENTION

1. Field of the Invention:

This invention relates to a toroidal continuous variable transmission adapted to transmit the rotation of an input disc, which is provided so as to be opposed to an output disc, to the output disc via power rollers, which are adapted to be rotated with the power rollers contacting the input and output discs, by changing a speed of the mentioned rotation in a stageless manner in accordance with an angle of turn of the power rollers.

2. Description of the Prior Art:

A toroidal continuous variable transmission mounted on an automobile is generally a double cavity type transmission in which two variable speed change units are provided on the same shaft. This toroidal continuous variable transmission has an input shaft into which an engine output is inputted, a pair of input discs supported rotatably on the input shaft, output discs provided so as to be opposed to the input discs respectively, and supported rotatably on the input shaft, power rollers provided between the opposed input discs and output discs, adapted to transmit torque from the input discs to the output discs and capable of being turned, a member for unitarily connecting the opposed output discs together, and pressure means provided between a flange of the input shaft and input discs and adapted to work on the input discs and change a pressing force of the power rollers in accordance with the magnitude of the input torque, the rotation of the input discs being subjected to a stageless speed change in accordance with an angle of turn of the power rollers and transmitted to the output discs.

In this toroidal continuous variable transmission, the turning of the power rollers is done by a variable speed change unit. Various types of variable speed change units (Japanese Patent Laid-Open Nos. 82065/1986, 46060/1987 and 203957/1988) have heretofore been known. The known variable speed change units include, for example, a variable speed change unit shown in FIG. 6. FIG. 6 shows one variable speed change unit but, in the case of a double cavity type toroidal continuous variable transmission, a structure capable of supplying a hydraulic pressure to two variable speed change units is provided.

As shown in FIG. 6, a variable speed change unit 1 in a toroidal continuous variable transition 1 is provided with input discs 3 on an input shaft 3S, and output discs on an output shaft similarly, though they are not shown. A pair of power rollers 2 are provided in an opposed state so that they are held between the input discs 3 and output discs which are provided so as to be opposed to each other, and these power rollers 2 are supported rotatably on trunnions 4. The power rollers 2 are supported on the trunnions 4 via eccentric shafts 5. The trunnions 4 are supported pivotably and axially movably on a transmission casing (not shown). Namely, each trunnion 4 has a trunnion shaft 6, and can be turned therearound and moved in the direction of the axis thereof. Pistons 7 are fixed to the shaft 6 of the trunnions 4 so that they can be moved slidingly in hydraulic cylinders 8 formed in the transmission casing. The hydraulic cylinders 8 are provided therein with two cylinder chambers 8a, 8b defined by the pistons 7.

The cylinder chambers 8a, 8b in the hydraulic cylinders 8 communicate with a spool valve 10 via lines 9a, 9b. A spool 11 provided in the spool valve 10 is maintained in a neutral position by springs 12 provided at both ends thereof. The spool valve 10 is provided with an Sa port at one end thereof, and an Sb port at the other end thereof. A pilot pressure is supplied to the Sa port via a solenoid valve 13a, and to the Sb port via a solenoid valve 13b. The spool valve 10 also has a P communicating with a pump pressure (pressure source), an A port communicating with the cylinder chamber 8a via the lines 9a, a B port communicating with the cylinder chamber 8b via the conduit 9b, and T ports communicating with a drain to atmospheric pressure. The solenoid valves 13a, 13b are operated by a control signal outputted from a controller 14.

A precession cam 15 is connected to a free end of one trunnion shaft 6, and one end of a lever 16, an intermediate portion of which is pivotably connected, contacts the precession cam 15, the other end of the lever 16 being connected to a potentiometer 17. The potentiometer 17 is adapted to detect the axial displacement and an angle of turn of the shaft 6 of the trunnion 4 as an amount of composite displacement, and input a detected signal into the controller 14. This variable speed change unit is further provided with various kinds of sensors, such as a vehicle speed sensor 18, an engine revolution sensor 19 and a degree of opening of throttle sensor 20, and formed so that signals of speed change information including a vehicle speed, engine revolutions and a degree of opening of a throttle detected by these sensors are inputted into the controller 14.

The toroidal continuous variable transmission utilizes a principle that, when the trunnions 4 are displaced from neutral positions (positions in which the axes of rotation of the power rollers 2 cross those of rotation of the input discs 3 and output discs) in one of the directions of the trunnion shafts (put discs) in one of the directions of the trunnion shafts), the trunnions 4 are turned around the trunnion shafts 6 in a direction and at a speed which are in accordance with the speed and the amount of the mentioned displacement, a speed change being carried out by such turning movements of the trunnions 4.

The operation of this variable speed change unit will now be described. The controller 14 is adapted to compute an actual speed change ratio on the basis of an amount of composite displacement of the trunnions 4 detected by the potentiometer 17, set target displacement of the trunnions 4 in accordance with a difference between the actual and target speed change ratios, and output control signals to the solenoid valves 13a, 13b. Consequently, hydraulic pressures Sa, Sb are supplied from the solenoid valves 13a, 13b to both ends of the spool valve 10. When the relation between the hydraulic pressures Sa, Sb supplied to the spool valve 10 in this manner is Sa>Sb, the spool 11 is shifted to left (FIG. 6), and the line 9a communicates with a power source P via the P port, the line 9b communicating with the drain via the T ports, a pressure Pa in the conduit 9a becoming higher than Pb in the line 9b (Pa>Pb). As a result, due to a difference between the pressures in the cylinder chambers 8a, 8b, the left (FIG. 6) trunnion 4 is displaced downward, and the right trunnion 4 upward. In accordance with this displacement, the trunnions 4 are turned around the trunnion shafts 6 to start a speed change operation. A feedback control operation is carried out by the controller 14 so that the actual speed change ratio comes close to the target speed change ratio. As the actual speed change ratio comes close to the target speed ratio, the target displacement of the trunnions 4 approaches zero, and, when the actual speed change ratio has agreed with the target speed change ratio, the target displacement of the trunnions 4 becomes zero to finish the speed change operation.

According to this variable speed change unit, when an actual speed change ratio agrees with a target speed change ratio with the target displacement of the trunnions 4 at a zero level, the pressures applied to both ends of the spool valve 10 become equal (Sa=Sb9), and the spool 11 in the spool valve 10 returns to the neutral position, so that the pressures in the two cylinder chambers 8a, 8b become equal (Pa=Pb).

During the transmission of torque, the power rollers 2 receive from the input discs 3 and output discs a tangential force F in the directions of dual arrows F shown in FIG. 6. Accordingly, the trunnions 4 supporting the power rollers 2 receive a force F in the direction of the trunnion shafts the level of which is in accordance with transmission torque and speed change ratio, and is displaced finely in the direction of the axes of the trunnion shafts. These phenomena will now be described in detail with the attention paid to the right (FIG. 6) trunnion 4. When a force F in the direction of the trunnion shaft is applied to this trunnion 4, the relative piston 7 is displaced upward, and the pressure in the relative cylinder chamber 8b increases with that in the other cylinder chamber 8a decreasing, whereby a pressure difference occurs between the two cylinder chambers 8a, 8b. This pressure difference increases as the displacement amount of the piston 7 increases, and, when the pressure difference reaches a level which bears proportion to the level of the force F in the direction of the trunnion shaft, the piston 7 stops. Thus, during the transmission of torque, the trunnion 4 is finely displaced in the direction of the trunnion shaft due to the external force (arrow F) which the relative power roller 2 receives. As a result, the axial displacement of the trunnion shaft 6 unitarily provided on the trunnion 4 is detected by the potentiometer 17, and the controller 14 outputs control signals to the solenoid valves 13a, 13b so as to start a speed change operation again. Thus, when a conventional variable speed change unit receives such an external force F, a speed change operation is started again, though the speed change operation has finished. This prevents a speed change control operation from being carried out stably, and causes a decrease in the speed changing efficiency, and an increase in the heating value due to a number of repeated side slips.

SUMMARY OF THE INVENTION

A primary object of the present invention is to solve these problems, and provide a toroidal continuous variable transmission capable of preventing trunnions, which support power rollers, from being displaced even when the power rollers receive during the transmission of torque an external force from input discs provided on an input shaft and output discs provided on an output shaft, by generating an external force-offsetting force the moment an external force is applied to the power rollers; capable of obtaining a stable speed change ratio with a high efficiency; and being low in heat generation.

Another object of the present invention is to provide a toroidal continuous variable transmission comprising input discs provided on an input shaft and output discs provided on an output shaft, which input and output discs are opposed to each other; a pair of power rollers adapted to change a speed of rotation of the input discs stagelessly in accordance with the variation of an angle of turn of the power rollers with respect to the input and output discs and transmit the rotation of a changed speed; a pair of trunnions which support the power rollers so that the power rollers can be rotated, and which are adapted to be displaced from neutral positions in the directions of trunnion shafts and thereby turned there-around; hydraulic cylinders having two cylinder chambers respectively and adapted to displace the trunnions in the directions of the trunnion shafts; a spool valve provided therein with a spool adapted to shut off the two cylinder chambers from each other when the spool is in a neutral position, and allow the cylinder chambers to communicate with a hydraulic pressure source and a tank respectively when the spool is in a position spaced from the neutral position; a sleeve fitted slidably between a valve casing of the spool valve and the spool, capable of being shifted axially due to a difference between the pressures in the two cylinder chambers and urged constantly toward the neutral position by the force of springs; and lines for setting communicating on between the sleeve and cylinder chambers so that a hydraulic pressure in one cylinder chamber works on one and surface of the sleeve with a hydraulic pressure in the other cylinder chamber working on the other end surface thereof.

When the spool in the spool valve is shifted from a neutral position to a first or second position, a hydraulic pressure P is supplied to one cylinder chamber of each hydraulic cylinder, and the other cylinder chamber communicates with a drain. Consequently, the pistons in the hydraulic cylinders are moved, and the trunnions are displaced from neutral positions in the axial direction of the trunnion shafts, i.e., in the direction of the trunnion shafts. When the trunnions are displaced from neutral positions, the power rollers are turned, and a speed changing operation is started.

The spool valve is controlled by a controller in response to a difference between a variable speed ratio calculated by detecting the displacement of the trunnions in the direction of the trunnion shafts and an angle of turn thereof and a predetermined target variable speed ratio calculated by detecting variable speed change information. A feedback control operation is carried out so that an actual variable speed ratio approached a target variable speed ratio, and, when an actual variable speed ratio agrees with a target variable speed ratio, the spool valve is closed. As a result, the supplying of a hydraulic pressure to the hydraulic cylinders is stopped, and the speed changing operation is finished with the trunnions returned to the neutral positions.

When the power rollers receive an external force from the input and output discs during the transmission of torque, a force in the direction of the trunnion shafts works on the trunnions at the same level and in the same direction as the external force. The moment the force in the direction of the trunnion shafts works on the trunnions, a pressure difference occurs in the two cylinder chambers. Since this pressure difference works instantly on both ends of the sleeve, the sleeve is axially shifted. When the sleeve, which is urged toward the neutral position, is shifted, an urging force for returning the sleeve to the neutral position occurs. Since the magnitude of this urging force is equal to that of the force in the direction of the trunnion shaft, and, since the former force works in the opposite direction to the latter force, the force in the direction of the trunnion shafts is offset by the urging force, and the differential pressure of the two cylinder chambers is maintained in a balanced state with respect to the external force, so that the trunnions are not displaced. Consequently, the trunnions are not finely displaced in the direction of the external force even when they receive an external force, i.e., the trunnions are retained in the neutral positions.

Even when the magnitude of the force in the direction of the trunnion shafts varies, the magnitude of the urging force also varies accordingly, and the force F in the direction of the trunnion shafts and the difference between the pressures in the two cylinder chambers are always kept balanced. Therefore, the trunnions are not displaced, and a speed changing operation is not started again after it has once been finished. Accordingly, in this toroidal continuous variable transmission, a stable variable speed ratio can be maintained even during the transmission of torque, and, since unnecessary speed change, which is carried out in a conventional toroidal continuous variable transmission, is not carried out, heat occurs due to produced by a side slip of the power rollers decreases accordingly, so that a highly efficient stageless speed changing operation can be carried out.

The spool valve is provided with damping means for lessening the hydraulic pressure working on the end surface of the sleeve. During the transmission of torque, fine speed changes are carried out repeatedly, and a difference between the pressures in the two cylinder chambers varies in the range of O–P. However, when the hydraulic pressure works on the sleeve via suitable damping means, such as orifices, the level of the pressure difference becomes proportional to that of the external force which the trunnions receive from the input and output discs, so that the sleeve is shifted from a neutral position in accordance with the external force.

This toroidal continuous variable transmission employs a spool valve of a simple construction in which only a sleeve is provided without using any special sensors and any controllers of a high processing capacity, so that this transmission has a simple and inexpensive general construction.

Still another object of the present invention is to provide a toroidal continuous variable transmission comprising solenoid valves adapted to control the position of the spool in the spool valve, and a controller adapted to control operation of the solenoid valves in response to a control signal corresponding to the neutral position of the spool valve calculated on the basis of a target variable speed ratio and an input torque value, and a control signal corresponding to a difference between the target variable speed ratio and an actual variable speed ratio.

This controller had an input torque operation means adapted to receive as an input a detected value concerning variable speed ratio information detected by a variable speed ratio information detector and calculate an input torque value, a target variable speed ratio operation means adapted to receive as an input the detected value concerning the variable speed ratio information and calculate a target variable speed ratio, a variable speed ratio operation means adapted to receive as an input an amount of composite displacement of the shafts of the trunnions detected by a potentiometer and calculate an actual variable speed ratio, a spool valve neutral position operation means adapted to calculate the neutral position of the spool valve, which is in accordance with the magnitude of an external force which the trunnions receive, on the basis of the input torque value and target variable speed ratio, a deviation operation means adapted to calculate a difference between the target variable speed ratio and actual variable speed ratio, and a solenoid valve operation control means adapted to set a control signal corresponding to the neutral position and a control signal corresponding to the variable speed ratio difference and output these control signals to the solenoid valves.

The variable speed ratio information detector represents a sensor, such as a sensor for detecting engine revolutions, a sensor for detecting the degree of opening of a throttle, and a sensor for detecting a vehicle speed. The input torque value may be calculated by using a map stored in the controller as information representing experimentally determined relation between engine revolutions, the degree of opening of the throttle and input torque valve, or by computing in the controller on the basis of a value detected by the sensor. The calculation of the input torque value may also be made by using suction vacuum of the engine and a torque sensor.

The solenoid valves may be formed by duty valves or proportional valves which are capable of controlling a hydraulic pressure electrically, and they may also be formed by two-way valves or three-way valves. The solenoid valves may be valves which are capable of supplying a hydraulic pressure to both ends of a spool valve. Accordingly, one solenoid valve may be connected to each end portion of a spool valve. It is also allowable to connect one solenoid valve to one end portion alone of a spool valve, and apply a predetermined hydraulic pressure to the other end portion thereof, or provide a spring on the non solenoid-valve-connected end portion thereof. In the latter case, the spring force has to be set large.

This toroidal continuous variable transmission employs a pilot driving system constructed so that a hydraulic pressure is supplied to the cylinder chambers in the hydraulic cylinders via a spool valve with the trunnions displaced accordingly in the direction of the trunnion shafts but it may also employ a direct-acting system in which the hydraulic pressure supplied to the cylinder chambers is controlled directly by solenoid valves. In the case where the direct-acting speed change control unit is employed, the hydraulic pressure supplied to the cylinder chambers becomes equal to that supplied to both ends of a spool valve in the pilot-driving system.

The pilot driving system having variable speed change units will now be described. The controller is constructed so that a control signal corresponding to a neutral position of the spool valve which is calculated on the basis of a target variable speed ratio and an input torque value and a control signal corresponding to a difference between the target variable speed ratio and an actual variable speed ratio are outputted to solenoid valves. This controller does not differ from a conventional controller in that a control signal corresponding to a deviation of variable speed ratio is outputted to solenoid valves but it differs therefrom in that a control signal corresponding to a neutral position of a spool valve which is determined on the basis of a target variable speed ratio and an input torque value is also outputted with the mentioned control signal to the solenoid valves. Therefore, the neutral position of the spool valve is shifted from a proper neutral position. Accordingly, when a control signal corresponding to the deviation is outputted to the solenoid valves, a pressure difference occurs in the two cylinder chambers. Since this pressure difference is offset by an external force which the trunnions receive from the input and output discs, the trunnions are maintained in neutral positions in the direction of the trunnion shafts, and a speed changing operation is not started again.

Regarding the controller, the target variable speed ratio operation means calculates a target variable speed ratio on the basis of a detected value concerning various kinds of information detected by the variable speed ratio information detector, and the input torque operation means an input torque value. The spool valve neutral position operation means calculates a neutral position of the spool valve corresponding to the magnitude of an external force which the trunnions receive, on the basis of the target variable speed ratio and input torque value.

The variable speed ratio operation means calculates an actual variable speed ratio on the basis of an amount of composite displacement of the trunnions detected by the potentiometer. The deviation operation means calculates a difference between a target variable speed ratio and an actual variable speed ratio.

The solenoid valve operation control means sets a control signal corresponding to the neutral position of the spool valve which is calculated by the spool valve neutral position operation means, and a control signal corresponding to a deviation calculated by the deviation operation means, and outputs the sum of these control signals to the solenoid valves.

When the control signal is inputted from the solenoid valve operation control means into the solenoid valves, a hydraulic pressure difference occurs at both end portions, to which a hydraulic pressure is supplied from the solenoid valves, of the spool valve, and the spool is displaced to a position in which the hydraulic pressure difference and a spring force are balanced with each other. In accordance with the displacement of the spool, a hydraulic pressure P is supplied to one cylinder chamber of a hydraulic cylinder, and the other cylinder chamber communicates with the drain. The piston in the hydraulic cylinder is moved, and the trunnions are displaced from the neutral positions in the direction of the trunnion shafts. When the trunnions are displaced from the neutral positions, the power rollers receive a force from the input and output discs accordingly in the direction of a speed vector, and start being turned.

As the variable speed ratio approaches the target variable speed ratio, the target displacement of the trunnions approaches zero. When the variable speed ratio agrees with the target variable ratio, the target displacement of the trunnions becomes zero, and the spool valve is closed, so that the supplying of a hydraulic pressure to a hydraulic pressure output is stopped, whereby the speed changing operation finishes. Although the hydraulic pressures in the cylinder chambers do not agree with each other at this time, the trunnions are retained in the neutral positions since the external force which the trunnions receive from the input and output discs and the hydraulic pressure difference are offset against each other. Therefore, the speed changing operation is not started again.

Another object of the present invention is to provide a toroidal continuous variable transmission comprising solenoid valves constituting a speed change unit of a direct-acting system and adapted to control a hydraulic pressure supplied to two cylinder chambers, and a controller adapted to control the solenoid valves in response to a control signal corresponding to the magnitude of an external force which the trunnions receive from the input and output discs and a control signal corresponding to a difference between a target variable speed ratio and an actual variable speed ratio.

This direct-acting type speed change unit is identical with the above-mentioned pilot driving type speed change unit, which is capable of offsetting the external force which the trunnions receive from the input and output discs by a difference between the hydraulic pressures in the two cylinder chambers, enables the trunnions to be maintained in neutral positions, whereby the speed changing operation is not started again.

As described above, this toroidal continuous variable transmission is constructed so that a control signal corresponding to the neutral position of a spool valve which is calculated on the basis of a target variable speed ratio and an input torque value and a control signal corresponding to a difference between the target variable speed ratio and an actual variable speed ratio are outputted to solenoid valves. When the trunnions receive an external force from the input and output discs during the transmission of torque, a pressure difference offsetting the external force occurs in the cylinder chambers. Accordingly, even when an external force is supplied to the trunnions, they are maintained in the neutral positions, and an unnecessary speed changing operation is not started after a speed changing operation has once finished. Therefore, in this toroidal continuous variable transmission, a stable variable speed ratio can be maintained during the transmission of torque, and, since unnecessary and useless speed change, which is carried out in a conventional toroidal continuous variable transmission, is not carried out, heat produced by a side slip of the power rollers decreases accordingly, so that a highly efficient stageless speed changing operation can be carried out.

DESCRIPTION OF THE PREFERRED EMBODIMENTS

Figure 1:
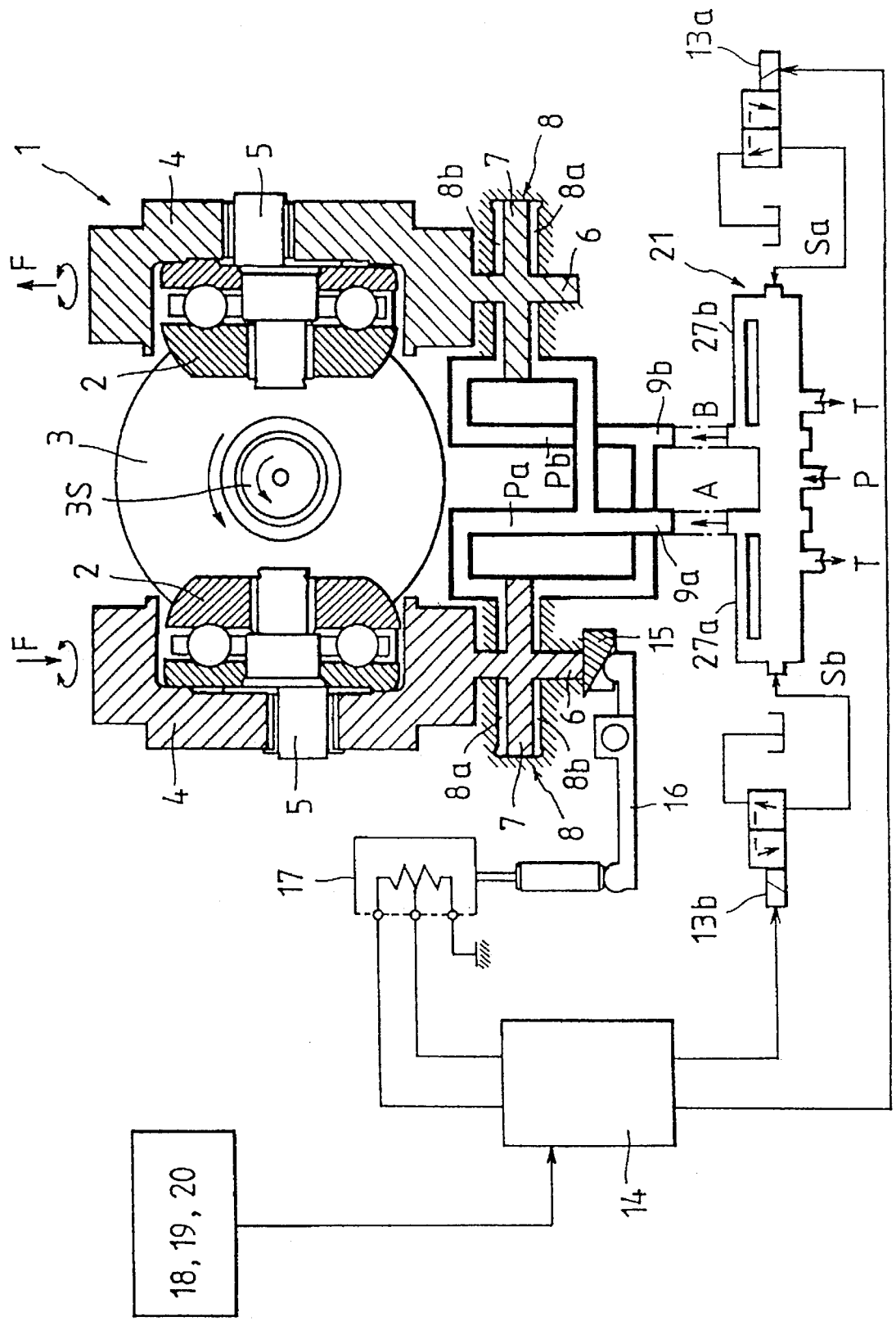
FIG. 1 is a sectional view showing an embodiment of the toroidal continuous variable transmission according to the present invention.

An embodiment of the toroidal continuous variable transmission according to the present invention will now be described with reference to the drawings. In order to simplify a description of the embodiment, FIG. 2 illustrates only the relation between a right hydraulic cylinder and a spool valve in the toroidal continuous variable transmission of FIG. 1, the spool valve being constructed so that a hydraulic pressure is supplied to a left hydraulic cylinder as well. The speed change unit (speed change control unit) shown in FIG. 1 has substantially the same construction, but the construction of the spool valves is different, and, therefore, the same parts are designated by the same reference numerals, whereby the duplication of description of the construction of the speed change unit excluding the spool valve is omitted.

The input discs 3 provided on an input shaft 3S and output discs provided similarly on an pnput shaft are opposed to each other, and a pair of power rollers 2 are provided between these input and output discs. Each power roller 2 is rotated keeping in contact with both of the discs and can be turned, the rotation of the input discs 3 being subjected to a stageless speed change in accordance with an angle of turn of the power rollers, the resultant rotation being transmitted to the output discs. Each power roller 2 is supported on a trunnion 4 via an eccentric shaft 5 so that the power roller 2 can be turned. Below each power roller 2, a hydraulic cylinder 8 is provided.

The hydraulic cylinders 8 have two cylinder chambers 8a, 8b defined by pistons 7 unitarily provided on the trunnions 4, and, when a hydraulic pressure is supplied to either one of the cylinder chambers 8a, 8b via a spool valve 21, the trunnions 4 are displaced from neutral position in the axial direction of trunnion shafts 6, 6. The trunnions 4 are constructed so that they are turned around the trunnion shafts 6 in accordance with the displacement of the trunnions 4 in the direction of the trunnion shafts. The power rollers 2 are supported on the trunnions 4 via the eccentric shafts 5 so that the power rollers 2 can be turned. Accordingly, when the trunnions 4 are displaced from the neutral positions in the direction of the trunnion shafts, the power rollers 2 receive from the input discs 3 and output discs a force in the direction of velocity vector, and are turned with the trunnions 4 around the trunnion shafts.

The cylinder chambers 8a, 8b of the hydraulic cylinders 8 communicate with a spool valve 21 via lines 9a, 9b. The spool valve 21 has an Sa port at one end thereof, and an Sb port at the other end thereof. A pilot pressure Sa is supplied to the Sa port via a solenoid valve 13a, and a pilot pressure Sb to the Sb port via a solenoid valve 13b. The spool valve 21 is provided with a P port communicating with a pump pressure P (hydraulic pressure source), an A port communicating with the cylinder chambers 8a via the line 9a, a B port communicating with the cylinder chambers 8b via the conduit 9b, and T port communicating with a drain to atmospheric pressure (for example, tank T in FIG. 2). The solenoid valves 13a, 13b are constructed so that they are operated on the basis of a control signal outputted from a controller 14.

The spool valve 21 is formed by a casing 22 for a body, a spool 23 slidably housed in the casing 22, and a cylindrical sleeve 24 slidably fitted in a space between the casing 22 and spool 23. At both end portions of the sleeve 24, springs 25 are provided, and the sleeve 24 is maintained in a neutral position owing to the urging force of these springs 25. The sleeve 24 has a central bore 26 extending axially therethrough, in which central bore 26 the spool 23 is slidably fitted. The spool 23 is also provided with springs 31 at both end portions thereof, and maintained in a neutral position owing to the urging force of these springs 31.

The spool 23 in the spool valve 21 can be moved in the sleeve 24 and shifted selectively to one of three positions, i.e. a first position in which one cylinder chamber 8a communicates with the P port with the other cylinder chamber 8b communicating with the T ports, a second position in which the cylinder chamber 8a communicates with the T ports with the cylinder chamber 8b communicating with the P port, and a neutral position in which both the cylinder chambers 8a, 8b are shut off from the P port and T ports. The shifting of the spool 23 is done by the hydraulic pressure supplied from the Sa port and Sb port to the spool valve 21.

The A port of the spool valve 21 communicates with one cylinder chamber 8a via the line 9a, and with one end portion of the spool valve 21 via a line 27a. Therefore, when a hydraulic pressure is supplied from the A port to the hydraulic cylinder 8, the pressure at the A port works not only on the cylinder chamber 8a but also on one end surface 29 of the sleeve 24. When the A port is closed, the pressure in the cylinder chamber 8a works on the end surface 29 as well of the sleeve 24. The line 27a is provided in an intermediate portion thereof with an orifice 28a.

The B port of the spool valve 21 communicates with the other cylinder chamber 8b via the line 9b, and with the other end portion of the spool valve 21 via the line 27b. Accordingly, when a hydraulic pressure is supplied from the B port to the hydraulic cylinder 8, the pressure at the B port works not only on the cylinder chamber 8b but also on the other end surface 30 of the sleeve 24. When the B port is closed, the pressure in the cylinder chamber 8b works on the end surface 30 as well. The line 27b is also provided with an orifice 28b in an intermediate portion thereof.

The sleeve 24 has five through bores 32 in its cylindrical wall portion, and, when the sleeve 24 is in a neutral position, the positions of these through bores 32 correspond to those of the A port, B port, P port and two T ports made in the valve casing 22. The sleeve 24 is shifted axially by a difference between the pressures in the two cylinder chambers 8a, 8b. Since the differential pressure between the cylinder chambers 8a, 8b is also applied to both end surfaces 24, 30 of the sleeve 24, an amount of shift of the sleeve 24 from the neutral position is determined in accordance with this differential pressure and the force of the springs 25. A proper amount of shift of the sleeve 24 differs depending upon the magnitude of the pressure P supplied to the hydraulic cylinder 8 and a leakage amount on the hydraulic circuit but it is very small as compared with that (generally around 0.2 mm at largest) of the spool 23.

During the transmission of torque, fine speed change is carried out repeatedly, and a pressure difference between the two cylinder chamber 8a, 8b varies in the range of O–P. However, since orifices 28a, 28b are provided in the lines 27a, 27b, the pressure difference between the cylinder chambers 8a, 8b comes to have a value proportional to an external force F which the trunnion 4 receives from the input discs 3 and output discs. Consequently, the sleeve 24 is shifted from the neutral position in accordance with the external force F. When a large external force F works on the trunnion 4, the piston 7 also receives a large resistance due to the damping effect of the orifices 28a, 28b provided in the line 27a, 27b. Thus, the orifices 28a, 28b provided in the lines 27a, 27b constitute damping means for buffer hydraulic pressure and can function as filters for preventing fine displacement of the piston 7.

The operation of this toroidal continuous variable transmission will now be described. The controller 14 is adapted to calculate an actual variable speed ratio on the basis of an amount of composite displacement based on the displacement of the trunnions 4 in the direction of trunnion shafts and an angle of turn of the trunnions 4 which are detected by a potentiometer 17. Also, a target variable speed ratio is also calculated on the basis of values detected by various kinds of sensors, such as a vehicle speed sensor 18, an engine revolutions sensor 19 and a degree of opening of throttle sensor 20. The controller 14 is adapted to set target displacement in accordance with a difference between an actual variable speed ratio and a target variable speed ratio, and output a control signal to the solenoid valves 13a, 13b. The solenoid valves 13a, 13b into which this control signal is inputted supply hydraulic pressure Sa, Sb to both ends of the spool valve 21. When these pressures have relation Sa>Sb, the spool 23 is shifted to left (FIG. 2), and the line 9a communicates with a hydraulic pressure source via the P port, the line 9b communicating with a drain via the T ports, the pressure Pa in the conduit 9a becoming higher than that Pb in the line 9b (Pa>Pb). The pressure Pa also works on one end surface 29 of the sleeve 24 via the line 27a, and the sleeve 24 is shifted to right. During this time, an amount of shift of the sleeve 24 can be ignored since it is very small as compared with that of the spool 23.

Figure 2:
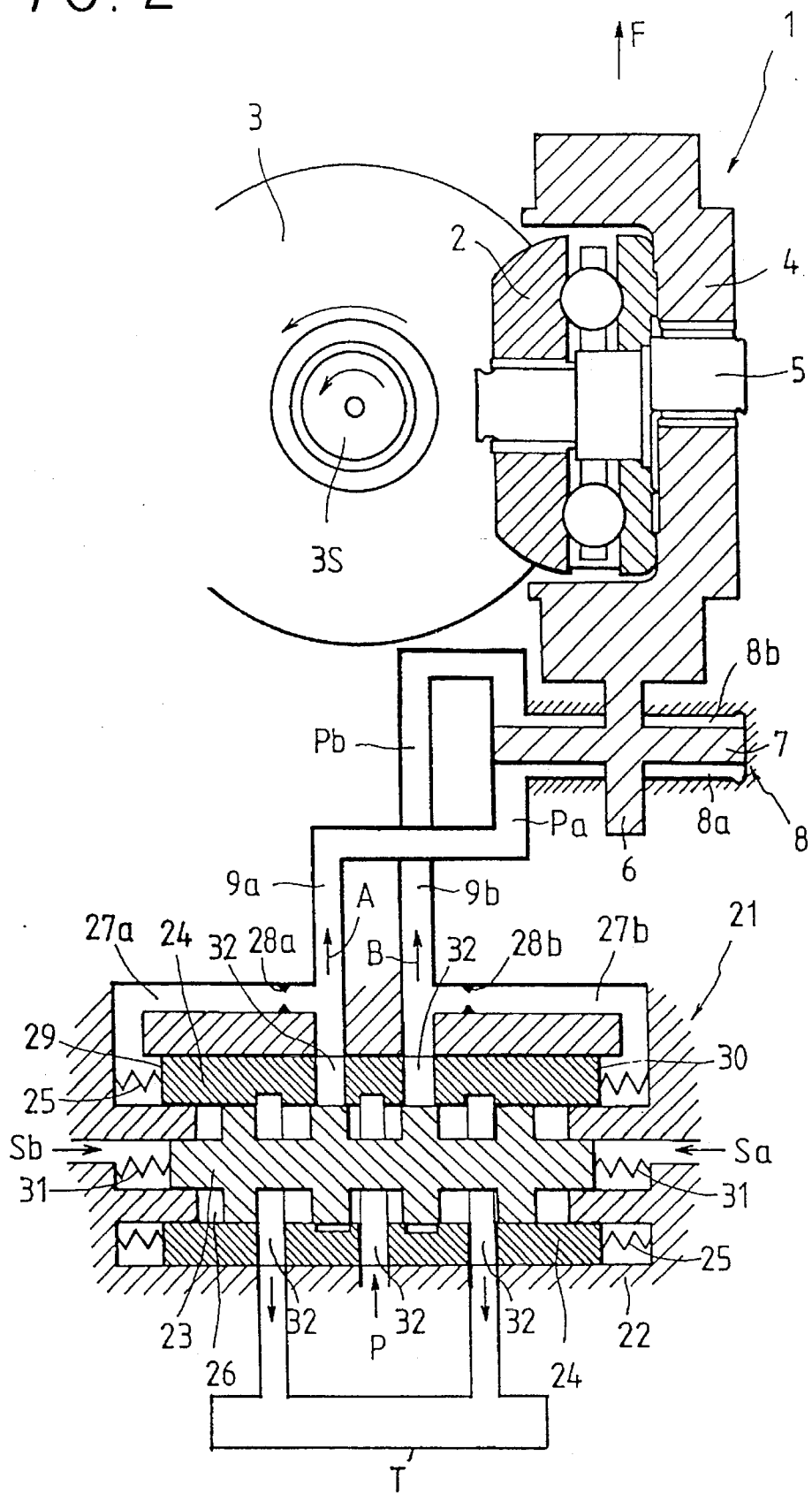
FIG. 2 is a sectional view showing the construction of a spool valve used in a speed change unit in the embodiment of FIG. 1.

When a pressure difference (Pa>Pb) occurs as mentioned above between the two cylinder chambers 8a, 8b, the left trunnion in FIG. 1 is displaced from the neutral position downward in the direction of the trunnion shaft, while the right trunnion 4 is displaced from the neutral position upward in the direction of the trunnion shaft. Synchronously with the displacement of the trunnions 4 in the direction of the trunnion shafts, the trunnions 4 are turned around the trunnion shafts to start a speed changing operation. As an actual variable speed ratio approaches a target variable speed ratio, the amount of displacement of the trunnions approaches zero, and, when an actual variable speed ratio agrees with a target variable speed ratio, the solenoid valves 13a, 13b are closed by a control signal from the controller 14. Consequently, the pressures Sa, Sb working on both ends of the spool 23 become equal, so that the spool 23 returns to a neutral position with the A port and B port of the spool valve 21 closed. During this time, the rightward-shifted sleeve 24 also returns to a neutral position due to the resilient force of the springs 25, and the pressures Pa, Pb in the two cylinder chambers 8a, 8b become equal. Namely, the pressures applied to the upper and lower surfaces of the pistons become equal (Pa=Pb). Thus, the speed changing operation is finished.

When an external force F is applied during the transmission of torque from the input discs 3 and output discs to the power rollers 2 in the direction of arrows F in FIGS. 1 and 2, the trunnions 4 receive a force, the direction and magnitude of which are the same as those of the external force F, in the direction of the trunnion shafts. During this time, a pressure difference occurs between the two cylinder chambers 8a, 8b. Namely, the pressure Pb in one cylinder chamber 8b becomes higher than that pa in the other cylinder chamber 8a (Pa<Pb). This pressure difference is applied directly to both end surface 29, 30 as well of the sleeve 24.

Figure 6:
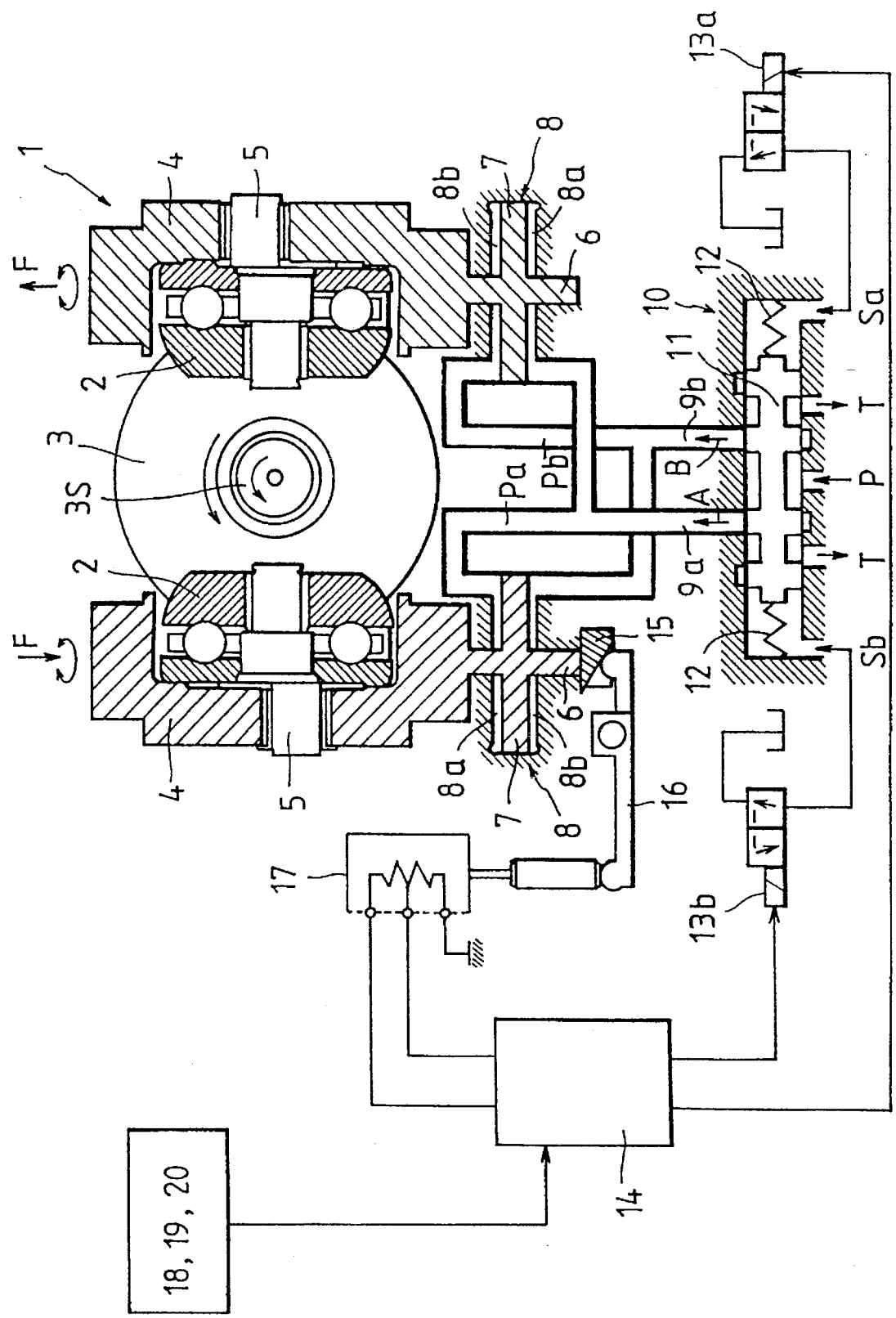
FIG. 6 is a sectional view showing a conventional toroidal continuous variable transmission.

The sleeve 24 is provided slidably in the spool valve 21. Accordingly, when a pressure difference occurs between both end surfaces of the sleeve 24, the sleeve 24 is shifted from a neutral position in the leftward direction and the pressure difference and the force of the springs 25 are put in a balanced state. Since the spring force works at a level equal to that of the force F working in the direction of the trunnion shafts, and in the direction opposite to this direction during this time, the force F in the direction of the trunnion shafts is offset by the spring force. The moment the magnitude of the force F in the direction of the trunnion shafts, which varies finely in repetition, varies, the magnitude of the spring force also varies but the pistons 7 are not displaced because this force F is offset by the spring force. Although the pistons in the conventional speed change control unit shown in FIG. 6 are displaced until the force F in the direction of the trunnion shafts placed until the force F in the direction of the trunnion shafts and pressure difference between the two cylinder chambers have been balanced, the force F in the direction of the trunnion shafts in the speed change unit according to the present invention is always maintained in a balanced state with respect to the pressure difference between the two cylinder chambers, so that the pistons 7 are not displaced.

Thus, even after the variable speed ratio has agreed with a target variable speed ratio with the level of displacement of the trunnions 4 having agreed with that of target displacement thereof and with the output pressures Sa, Sb from the solenoid valves 13a, 13b having become equal to each other the pressures Pa, Pb in the cylinder chambers 8a, 8b are maintained so that a pressure difference between these cylinder chambers is balanced against the force F in the direction of the trunnion shafts. Therefore, even when the trunnions 4 receive this force F, they are not displaced after all in the direction of the trunnion shafts. Accordingly, after the speed changing operation by this speed change unit has finished, an unnecessary speed change operation is not started, so that the heat produced by a side slip of the power rollers during a speed change operation can be minimized.

The spool valve 21 is formed so that the hydraulic pressure in one cylinder chamber 8a is applied to one end surface 29 of the sleeve 24 with that in the other cylinder chamber 8b applied to the other end surface 30 thereof. Therefore, when the force F in the direction of the trunnion shafts is applied to the trunnions 4 with the input discs 3 rotate not only forward but also backward, the trunnions 4 are not displaced in the direction of the trunnion shafts.

Figure 4:
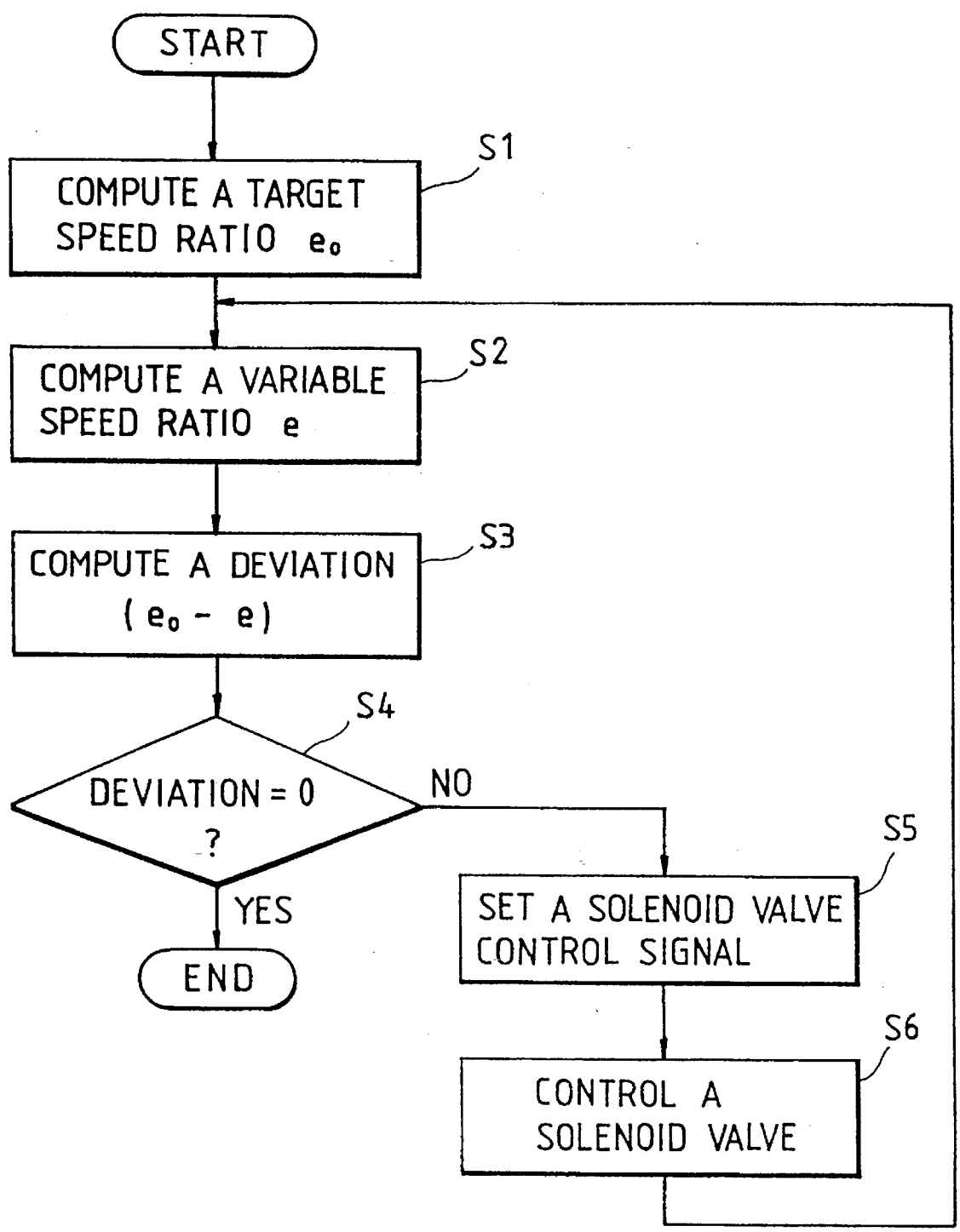
FIG. 4 is a flow chart showing the procedure of a speed change control operation of the speed change unit in the transmission of FIG. 3.
Figure 5:
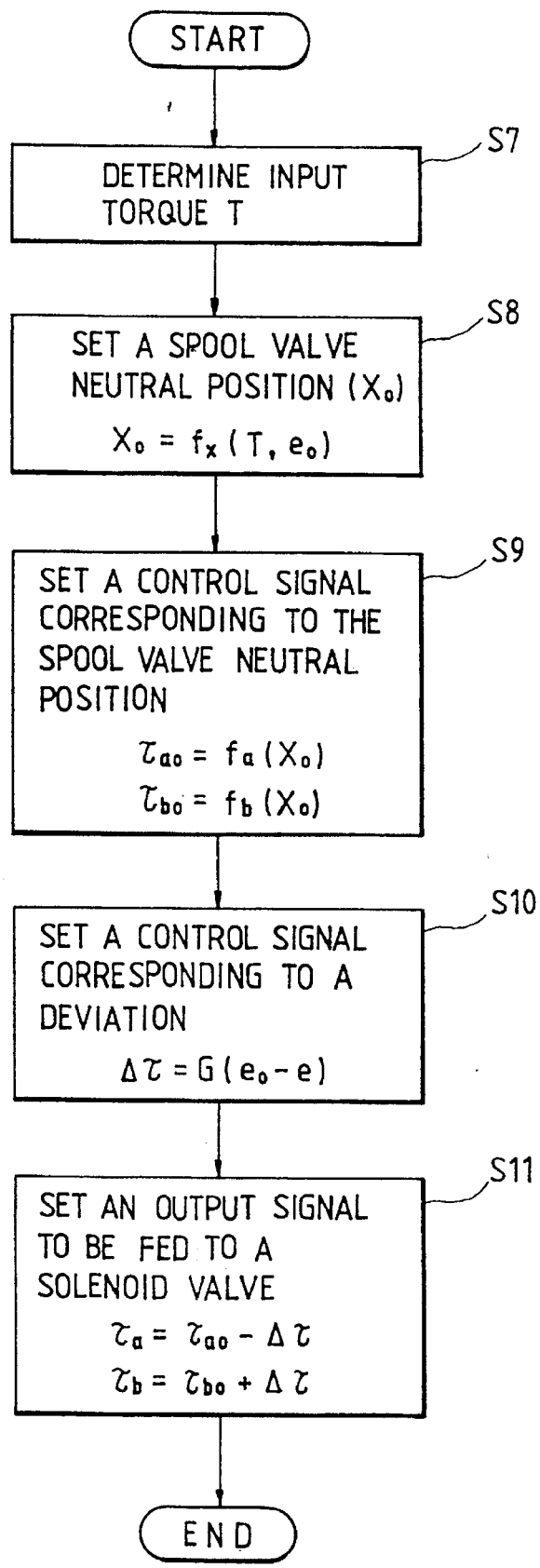
FIG. 5 is a flow chart showing the procedure for setting a solenoid valve control signal in the speed change unit shown in FIG. 3.

Another embodiment of the toroidal continuous variable transmission according to the present invention will now be described with reference to FIGS. 3–5. Since this toroidal continuous variable transmission except its controller can be incorporated in the toroidal continuous variable transmission shown in FIG. 6, a description thereof will be given the same parts designated by the same reference numerals.

Figure 3:
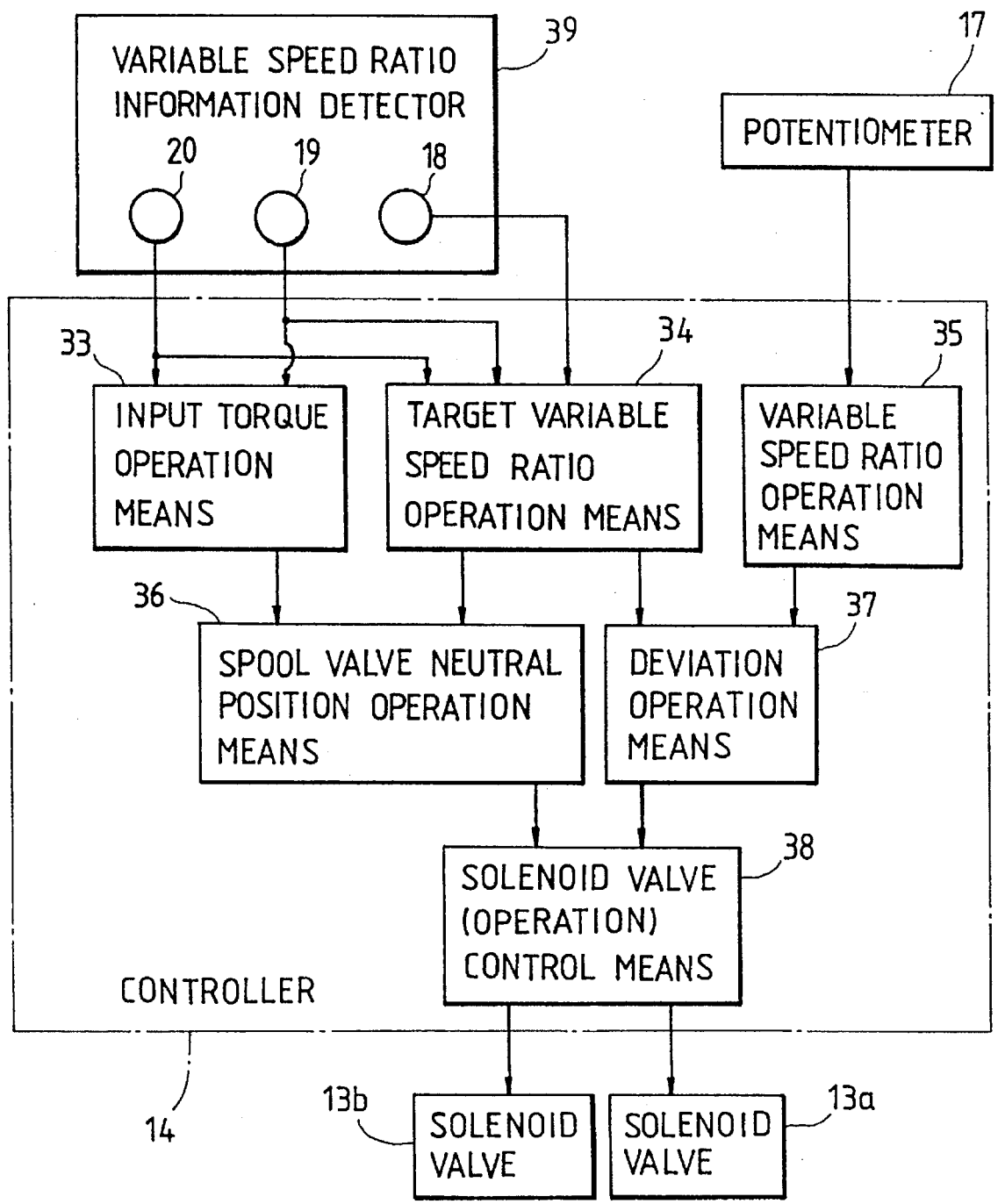
FIG. 3 is a block diagram of the toroidal continuous variable transmission according to the present invention.

A controller 14 in a speed change unit, i.e. a speed change control unit in this embodiment has as shown in FIG. 3 an input torque operation means 33 adapted to receive as an input a value concerning variable speed ratio information detected by a variable speed ratio information detector 39, and calculate an input torque value; a target variable speed ratio operation means 34 adapted to receive as an input a value concerning variable speed ratio information detected by the variable speed ratio detector 39, and calculate a target variable speed ratio; a variable speed ratio operation means 35 adapted to receive as an input an amount of composite displacement of shafts 6 of trunnions 4, i.e. an amount of composite displacement based on the axial displacement and an angle of turn of the trunnion shafts 6 detected by a potentiometer 17, and calculate an actual variable speed ratio; a spool valve neutral position operation means 36 adapted to calculate a neutral position of a spool valve 10, which corresponds to the magnitude of an external force F which the trunnions 4 receive, on the basis of an input torque value inputted from the input torque operation means 33 and a target variable speed ratio inputted from a target variable speed ratio operation means 24; a deviation operation means 37 adapted to calculate a difference between a target variable speed ratio inputted from the target variable speed ratio operation means 34 and an actual variable speed ratio inputted from the variable speed ratio operation means 35; and a solenoid valve operation control means 38 adapted to set a control signal corresponding to a neutral position of the spool valve and inputted from the spool valve neutral position operation means 36 and a control signal corresponding to a deviation inputted from a deviation operation means 37, and output the some of these control signals to solenoid valves 13a, 13b.

The variable speed ratio information detector 39 comprises sensors, such as a sensor 18 for detecting a vehicle speed, a sensor 19 for detecting engine revolutions, and a sensor for detecting the degree of opening of a throttle.

The input torque operation means 33 is adapted to experimentally determine in advance the relation between engine revolutions, the degree of opening of a throttle and an input torque value, and store them in the form of a table. The input torque operation means 33 is formed so as to receive as inputs engine revolutions detected by the sensor 19 and the degree of opening of a throttle detected by the sensor 20 and determine an input torque value by using a table stored in advance.

The target variable speed ratio operation means 34 is adapted to calculate an optimum variable speed ratio which is determined on the basis of a vehicle speed, engine revolutions and the degree of opening of a throttle detected by the sensors 18, 19, 20, and set it as a target variable speed ratio.

The variable speed ratio operation means 35 is adapted to receive as an input an amount of composite displacement of the trunnions detected by the potentiometer 17 and calculate and actual variable speed ratio. Since an amount of composite displacement detected by the potentiometer 17 when the power rollers 2 are in neutral positions with a variable speed ratio being one is used as a standard amount of composite displacement, a variable speed ratio can be calculated on the basis of an angle of turn measured when the power rollers 2 are in neutral positions.

The spool valve neutral position operation means 36 is adapted to receive as inputs an input torque value calculated by the input torque operation means 33 and a target variable speed ratio calculated by the target variable speed ratio operation means 34 and calculate a neutral position of the spool valve 10 corresponding to the magnitude of the external force F which the trunnions 4 receive from the input discs 3 and output discs. The spool valve neutral position operation means 36 stores in the form of a table the relation between a target variable speed ratio obtained by experiments in advance, an input torque value and spool valve neutral position.

The deviation operation means 37 is adapted to calculate a difference between a target variable speed ratio calculated by the target variable speed ratio operation means 34 and an actual variable speed ratio calculated by the variable speed ratio operation means 35.

The solenoid valve operation control means 38 is adapted to set a control signal corresponding to a neutral position of the spool valve inputted from the spool valve neutral position operation means 36, and a control signal corresponding to a deviation inputted form the deviation operation means 37, and output the sum of these control signals to the solenoid valves 13a, 13b.

The procedure for controlling a speed change operation by this speed change control unit will now be described with reference to FIG. 4. Before a speed change operation is started, the trunnions 4 are in so-called neutral position in which the axis of rotation of the power rollers 2 and that of the input discs 3 and output discs cross each other (START).

(1) Calculation of target variable speed ratio (Step 1):

The speed change information including engine revolutions, the degree of opening of a throttle and a vehicle speed is detected by the variable speed ratio information detector 39. The target variable speed ratio operation means 34 calculates an optimum variable speed ratio on the basis of this detected speed change information, and set this variable speed ratio as a target variable speed ratio $e_0$.

(2) Calculation for actual variable speed ratio (Step 2):

In this condition, an amount of composite displacement of the shafts 6 of the trunnions 4 is detected by the potentiometer 17. An actual variable speed ratio e at the present time is calculated on the basis of this amount of composite displacement.

(3) Calculation of deviation (Step 3):

A difference ($e_0-e$) between the actual variable speed ratio e calculated in Step 1 and the target variable speed ratio $e_0$ calculated in Step 2 is determined.

(4) Judgement as to whether to terminate a speed change control operation (Step 4):

A judgement as to whether the deviation is zero or not is made. Since a deviation of zero indicates that the target variable speed ratio $e_0$ has already been attained, the speed change control operation is finished (END). When the deviation is not zero, a subsequent Step 5 is taken, and the speed change control operation is continued.

(5) Setting of control signals to be outputted to Solenoid valves (Step 5):

The setting of control signals to be outputted to the solenoid valves 13a, 13b will be described later.

(6) Controlling of solenoid valves (Step 6):

The control signals $\tau a, \tau b$ set in Step 5 are outputted from the controller 14 to the solenoid valves 13a, 13b. For example, the decelerating of an automobile will be described. By the inputted control signals $\tau a, \tau b$, the solenoid valves 13a, 13b are operated, and the relation between the pressures applied to both ends of the spool valve 10 becomes Sa>Sb. Consequently, one cylinder chamber Sa or the hydraulic cylinder 8 communicates with the P port via the spool valve 10, and a hydraulic pressure is supplied thereto with the other cylinder chamber 8b communicating with the tank. This causes the relative trunnion 4 to be displaced from the neutral position in the direction of the trunnion shaft by a predetermined distance. When a vehicle is decelerated to a large extent, the amount of displacement in the direction of the trunnion shaft becomes large, while, when the vehicle is decelerated to a small extent, the amount of displacement in the direction of the trunnion shaft becomes small. When the trunnion 4 is displaced in the direction of the trunnion shaft, the relative power roller 2 receives a force in the direction of a velocity vector from the input discs 3 and output discs, and starts being turned.

(7) Feedback control operation (Step 6→Step 2):

A variable speed ratio e is then calculated (Step 2) on the basis of an amount of composite displacement detected by the potentiometer 17, and a difference between the variable speed ratio e and a target variable sped ratio $e_0$ calculated in Step 1 is determined (Step 3), a judgement as to whether the deviation becomes zero (or a level in a very small predetermined range) or not is made (Step 4). When the deviation is not zero, the setting of control signals $\tau a, \tau b$ to be sent to the solenoid valves 13a, 13b is done again, and these signals are outputted (Step 5) to the solenoid valves 13a, 13b, whereby the solenoid valves 13a, 13b are actuated (Step 6) as they are controlled. By repeating this control operation, the deviation approaches zero, and as the deviation approaches zero, the trunnion 4 gradually returns to the neutral position. When the deviation becomes zero, the speed changing operation finishes. As the variable speed ratio approaches the target level, the control signals $\tau a, \tau b$ sent to the solenoid valves 13a, 13b approaches $\tau a_0, \tau b_0$, respectively, and, when the speed changing operation finishes, these control signals agree with $\tau a_0, \tau b_0$.

In this feedback control operation, the control signals τa, τb, are sent with a predetermined feedback gain to the solenoid valves 13a, 13b. The gain may not be fixed, and maybe controlled so that it varies, for example, in accordance with a variable speed ratio, input revolutions and output revolutions. A differentiated or integrated value of a deviation may also be fed back.

The procedure for setting control signals to be outputted to the solenoid valves 13a, 13b will now be described with reference to the flow chart of FIG. 5.

(1) Calculation of input torque (Step 7):

Engine revolutions detected by the sensor 19 and the degree of opening of a throttle detected by the sensor 20 are inputted into the input torque operation means 33, and an input torque value T is calculated in the input torque operation means 33 on the basis of a table in which the relation, which has been determined experimentally in advance, between engine revolutions, the degree of opening of a throttle and an input torque value is stored.

(2) Setting of neutral position of spool valve (Step 8):

A target variable speed ratio $e_0$ calculated in Step 1 and an input torque value T calculated in Step 7, which calculations are made on the basis of the table storing in advance the relation between a target variable speed ratio $e_0$, an input torque value T and a neutral position $x_0$ of the spool, are inputted into the spool valve neutral position operation means 36, and a neutral position $x_0$ of the spool valve 10 corresponding to the magnitude of an external force F which the trunnions 4, 4 receive from the input discs 3 and output discs is calculated.

$x_0 = fx(T, e_0)$ (3) Setting of control signals corresponding to neutral position of spool valve (Step 9):

The control signals τa, τb to be outputted to the solenoid valves 13a, 13b correspondingly to the neutral position $x_0$ of the spool valve 10 calculated in step 8 are set.

$τa_0 = fa(X_0)$ $τb_0 = fb(X_0)$

Since the neutral position of the spool valve is shifted to right (FIG. 4) from a n original neutral position, these control signals have relation $τa_0 < τb_0$.

(4) Setting of signal corresponding to deviation (Step 10):

A control signal Δτ to be outputted to the solenoid valves 13a, 13b correspondingly to a deviation calculated in Step 3 in set.

Δτ=G($e_0$−e), wherein G is a coefficient.

(5) Setting of control signals to be outputted to the solenoid valve (Step 11):

The sum τa, τb of the control signals set in Steps 9 and 10 are set.

$τa = τa_0 − Δτ$ $τb = τb_0 + Δτ$

The set control signals a, b are outputted to the solenoid valves 13a, 13b (Step 6).

Returning now to the procedure for carrying out a speed change control operation shown in FIG. 4, the speed change control operation will be described once more and concretely. A case where an actual variable speed ratio e is larger than a target variable speed ratio $e_0$ ($e_0$−e<0), i.e. a case where a deceleration control operation is carried out will be described. Since the relation between the control signals τa and τb is τa>τb in this case, the relation between the pressures Sa, Sb applied to both ends of the spool valve 10 is Sa>Sb.

Accordingly, a hydraulic pressure is supplied to the cylinder chamber 8a, and discharged from the cylinder chamber 8b, the trunnions are displaced from a neutral position (the right trunnion in FIG. 6 is displaced upward, and the left trunnion downward). Since the trunnions 4 begin to be turned in accordance with the displacement mentioned above, a deviation ($e_0$−e) becomes smaller. During this time, the feedback control operation in Step 2 to Step 6 is repeated. The moment the relation between τa and τb becomes τa<τb, the relation between the pressures Sa, Sb applied to both ends of the spool valve 10 is reversed to become Sa<Sb. Consequently, a hydraulic pressure is supplied to the cylinder chamber 8b and discharged from the cylinder chamber 8a this time, so that the trunnions 4 return to neutral positions. While the feedback control operation is carried out repeatedly, the variable speed ratio e agrees with the target variable speed ratio $e_0$ in a short time, and the spool valve 10 is closed. At this time, the trunnions 4 are in neutral positions, in which the trunnions are balanced with the external force F. The signals τa, τb outputted to the solenoid valve are as follows.

$τa = τa_0$, $τb = τb_0$

In case where the variable speed ratio e is smaller than the target variable speed ratio $e_0$ ($e_0$−e>0), i.e., in a case where an acceleration control operation is carried out, the condition is contrary to that in the above-mentioned case where a deceleration control operation is carried out, so that a description thereof is omitted.

As described above, the controller 14 is formed so that the sums τa,τb of control signals $τa_0$, $τb_0$ corresponding to a neutral position of the spool valve calculated on the basis of a target variable speed ratio $e_0$ and an input torque value T and a control signal Δτ corresponding to a difference between a target variable speed ratio $e_0$ and an actual variable speed ratio e are outputted to the solenoid valves 13a, 13b.

The controller 14 is not different from the conventional controller 21 in that a control signal Δτ corresponding to the deviation is outputted to the solenoid valves 13a, 13b. This controller 14 is adapted to determine a neutral position $x_0$ of the spool valve 10 on the basis of a target variable speed ratio $e_0$ and an input torque value T, and output control signals $τa_0$, $τb_0$ as well which correspond to this neutral position to the solenoid valves 13a, 13b.

Therefore, while an external force F works on the trunnions, a neutral position $x_0$ of the spool ds11 in FIG. 6 is set so as to be offset slightly rightward from an original neutral position. Consequently, an amount of hydraulic pressure supplied to the cylinder chamber 8b becomes slightly larger than that of hydraulic pressure supplied to the cylinder chamber 8a. Accordingly, while the external force F works on the trunnions, a hydraulic pressure difference (Pa<Pb)

occurs between the two cylinder chambers 8a, 8b, and this hydraulic pressure difference and the external force F which the trunnions 4 receive from the input discs 3 and output discs are offset each other. Therefore, the trunnions 4 are maintained in neutral positions and a speed changing operation is not started again. Since an unnecessary speed changing operation is not therefore carried out after a speed changing operation has finished, heat produced by a side slip of the power rollers 2 during a speed changing operation is reduced to a minimum level.

What is claimed is:

1. A toroidal continuous variable transmission comprising an input disc provided on an input shaft; an output disc provided so as to be opposed to said input disc; an output shaft on which said output disc is mounted; a pair of power rollers adapted to be turned in contact with said input and output discs; stagelessly change a speed of rotation of said input and output discs in accordance with variation of an angle of turn of said power rollers with respect to said input and output discs and transmit the resultant speed of rotation to said output disc; trunnions supporting said power rollers rotatably and adapted to be displaced from their neutral positions in the direction of their shafts, whereby said power rollers are turned around said trunnion shafts; hydraulic cylinders having pistons for displacing said trunnions in the direction of said trunnion shafts, and cylinder chambers formed on both sides of said pistons; a spool valve provided with a spool adapted to shut off said cylinder chambers when said spool is in a neutral position, and allow each of said cylinder chambers to communicate alternately with a hydraulic pressure source and a drain at atmospheric pressure when said spool is displaced from said neutral position, such that a first one of said cylinder chambers communicates with the pressure source whenever a second one of said cylinder chambers communicates with said drain; a sleeve fitted slidably in a space between a valve casing for said spool valve and said spool, capable of being shifted axially in accordance with a pressure difference between said cylinder chambers and urged constantly toward a neutral position by a force of springs; and lines setting communication between end surfaces of said sleeve and said cylinder chambers so that a hydraulic pressure in one cylinder chamber is applied to one end surface of said sleeve with a hydraulic pressure in the other cylinder chamber applied to the other end surface thereof.

2. A toroidal continuous variable transmission according to claim 1, wherein said spool valve is controlled in response to a difference between a variable speed ratio calculated by detecting the displacement of said trunnions in the direction of said trunnion shafts and an angle of turn of said power rollers, and a predetermined target variable speed ratio.

3. A toroidal continuous variable transmission according to claim 1, wherein said lines are provided with orifices therein.

4. The toroidal continuous variable transmission according to claim 1, wherein the drain comprises a tank.

5. A toroidal continuous variable transmission comprising an input disc provided on an input shaft; an output disc provided so as to be opposed to said input disc; an output shaft on which said output disc is mounted; a pair of power rollers adapted to be turned in contact with said input and output discs, stagelessly change a speed of rotation of said input disc in accordance with variation of an angle of turn of said power rollers with respect to said input and output discs and transmit the resultant speed of rotation to said output disc; trunnions supporting said power rollers rotatably and adapted to be displaced from their neutral positions in the direction of their shafts, whereby said power rollers are turned around said trunnion shafts; hydraulic cylinders having pistons for displacing said trunnions in the direction of said trunnion shafts, and cylinder chambers formed on both sides of said pistons; a spool valve provided with a spool adapted to shut off said cylinder chambers when said spool is in a neutral position, and allow each of said cylinder chambers to communicate alternately with a hydraulic pressure source and a drain at atmospheric pressure when said spool is displaced from said neutral position, such that a first one of said cylinder chambers communicates with the pressure source whenever a second one of said cylinder chambers communicates with said drain; solenoid valves adapted to control a position of said spool in said spool valve; and a controller adapted to control the operations of said solenoid valves in response to a control signal corresponding to a neutral position of said spool valve calculated on the basis of a predetermined target variable speed ratio and an input torque value to be inputted to said input shaft, and a control signal corresponding to a difference between said target variable speed ratio and an actual variable speed ratio.

6. A toroidal continuous variable transmission according to claim 5, wherein said controller has an input torque operation means adapted to receive as an input a detected value concerning variable speed ratio information on said output shaft with respect to said input shaft and calculate an input torque value, a target variable speed ratio operation means adapted to receive as an input a detected value concerning said variable speed ratio information and calculate a target variable speed ratio, a variable speed ratio operation means adapted to receive as an input an amount of composite displacement of said shaft of said trunnions detected by a potentiometer provided on said trunnions and calculate an actual variable speed ratio a spool valve neutral position operation means adapted to calculate a neutral position of said spool valve, which corresponds to the magnitude of an external force received by said trunnions, on the basis of said input torque value and said target variable speed ratio, a deviation operation means adapted to calculate a difference between said target variable speed ratio and said actual variable speed ratio, and a solenoid valve operation control means adapted to set a control signal corresponding to said neutral position and a control signal corresponding to said difference and output said control signals to said solenoid valves.

7. The toroidal continuous variable transmission according to claim 5, wherein the drain comprises a tank.

8. A toroidal continuous variable transmission comprising an input disc provided on an input shaft; an output disc provided so as to be opposed to said input disc; an output shaft on which said output disc is mounted; a pair of power rollers adapted to be turned in contact with said input and output discs, stagelessly change a speed of rotation of said input disc in accordance with variation of an angle of turn of said power rollers with respect to said input and output discs and transmit the resultant speed of rotation to said output disc; trunnions supporting said power rollers rotatably and adapted to be displaced from their neutral positions in the direction of their shafts, whereby said power rollers are turned around said trunnions shafts; hydraulic cylinders having pistons for displacing said trunnions in the direction of said trunnion shafts, and cylinder chambers formed on both sides of said pistons; solenoid valves adapted to control hydraulic pressures supplied to said cylinder chambers; and a controller adapted to control said solenoid valves in response to a control signal corresponding to the magnitude of an external force which said trunnions receive from said input and output discs, and a control signal corresponding to a difference between a predetermined target variable speed ratio and an actual variable speed ratio.

* * * * *